H. P. JENKS.
KILN.
APPLICATION FILED OCT. 6, 1914.

1,179,928.

Patented Apr. 18, 1916.
3 SHEETS—SHEET 1.

WITNESSES:
Charles A. Mathé
Nicholas L. Petri

INVENTOR
Harford P. Jenks
BY John Lotka
ATTORNEY

H. P. JENKS.
KILN.
APPLICATION FILED OCT. 6, 1914.
1,179,928.
Patented Apr. 18, 1916.
3 SHEETS—SHEET 2.
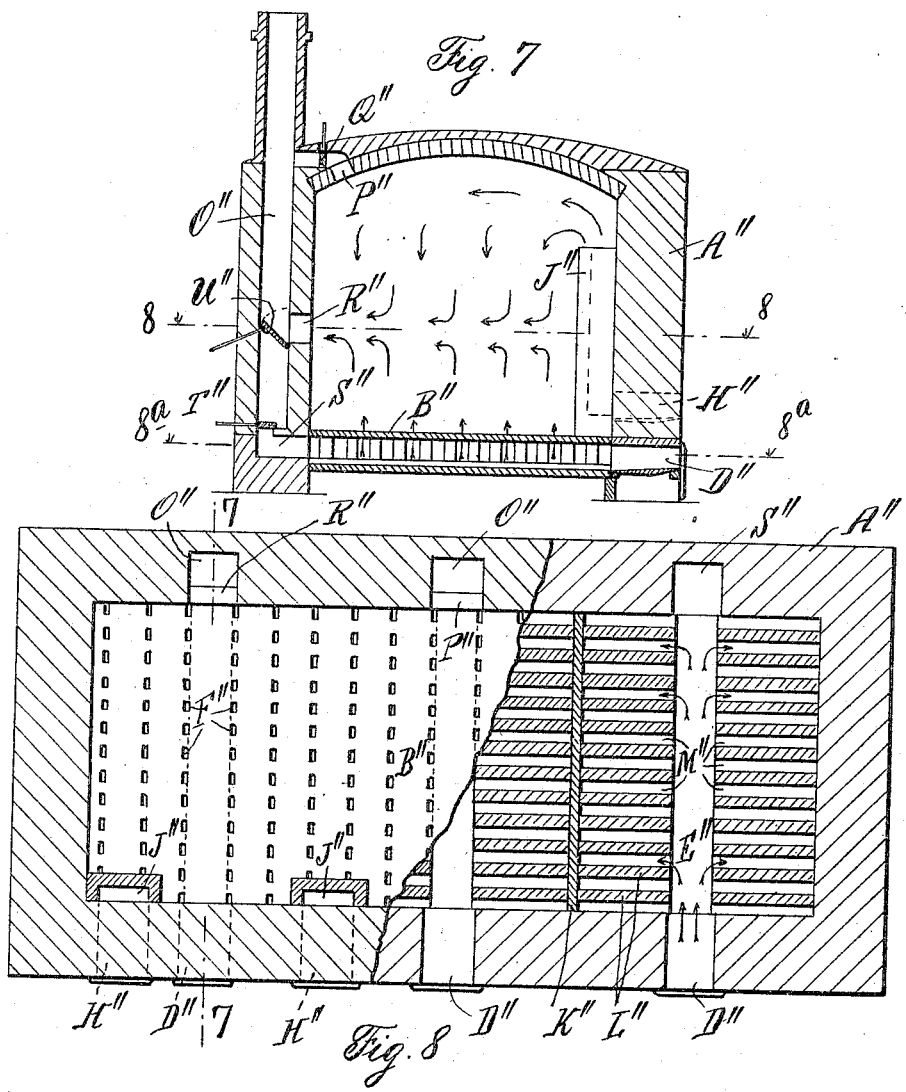
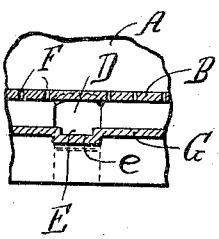
WITNESSES:
Charles A. Mathe
Nicholas Le Petri
INVENTOR
Harford P. Jenks
BY
John Lotka
ATTORNEY

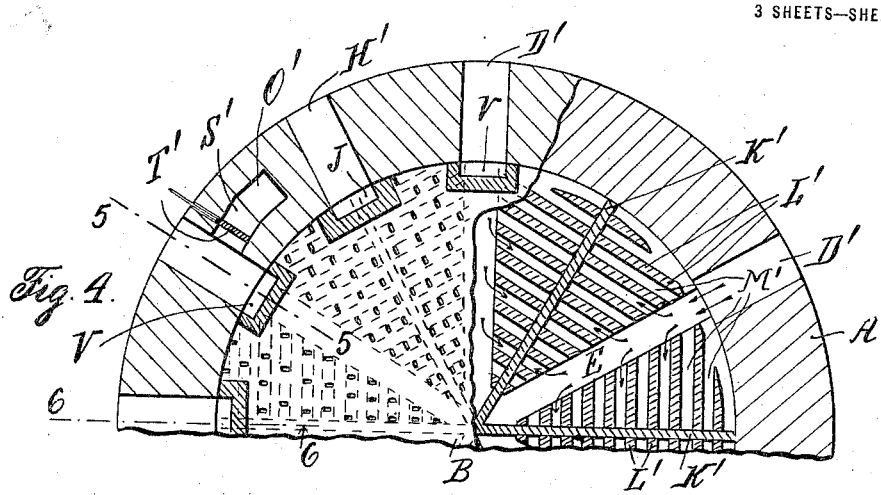
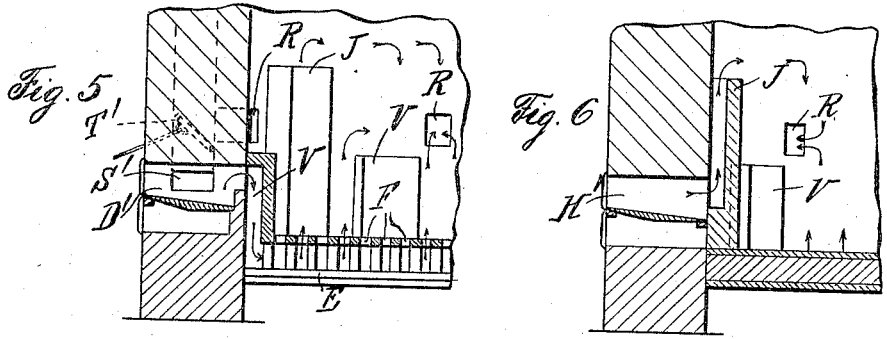
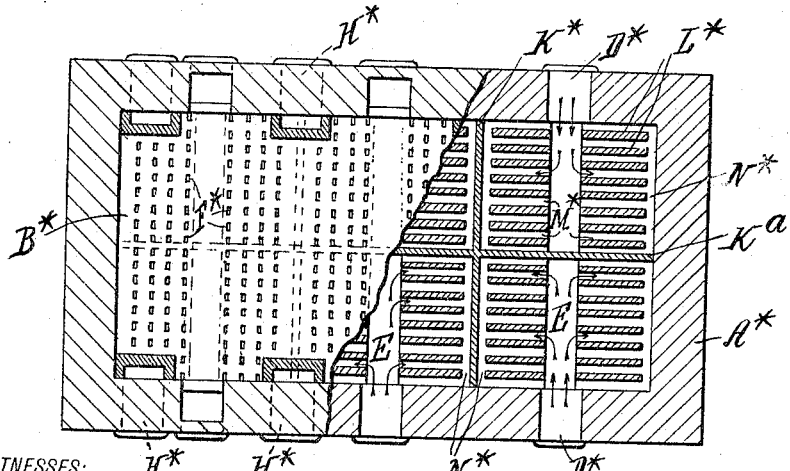

UNITED STATES PATENT OFFICE.

HARFORD P. JENKS, OF VIGO, OHIO.

KILN.

1,179,928.

Specification of Letters Patent. Patented Apr. 18, 1916.

Application filed October 6, 1914. Serial No. 865,301.

*To all whom it may concern:*

Be it known that I, HARFORD P. JENKS, a citizen of the United States, and resident of Vigo, in the county of Ross and State of Ohio, have invented certain new and useful Improvements in Kilns, of which the following is a specification.

My invention relates to kilns for burning bricks, pottery, and the like, and has for its object to provide an improved construction for heating the ware uniformly and efficiently, for varying the draft so that it may be directed either exclusively upward, or exclusively downward, or partly upward and partly downward, and for properly distributing the heating gases within the kiln.

The details of my invention will be fully set forth hereinafter with reference to the accompanying drawings, and the novel features will be pointed out in the appended claims.

Figure 1:
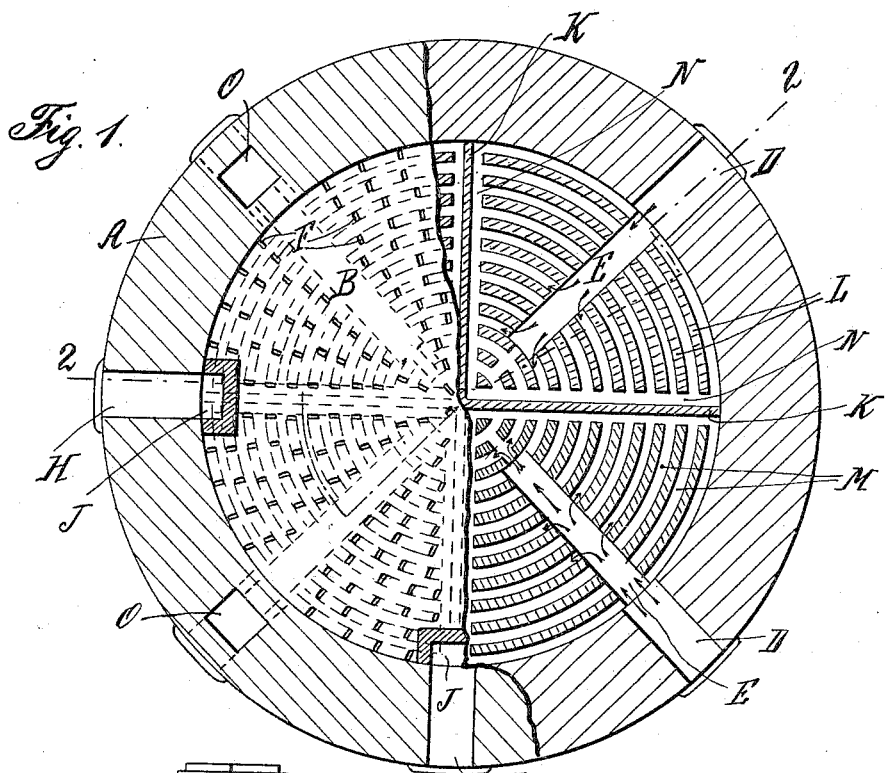
Figure 2:
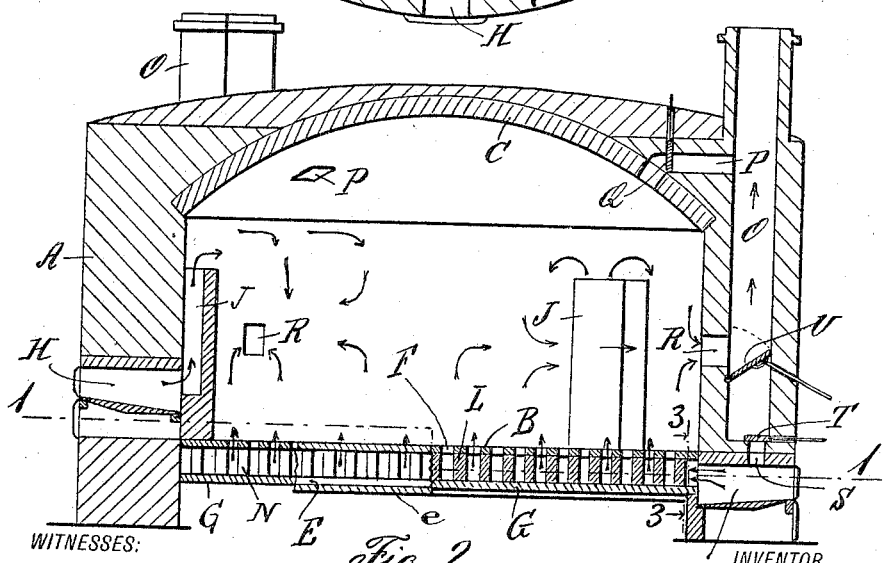

In said drawings, Figure 1 is a horizontal section, taken on the line 1—1 of Fig. 2, through a kiln embodying my invention; Fig. 2 is a vertical section therethrough, practically on the line 2—2 of Fig. 1; Fig. 3 is detail vertical section on the line 3—3 of Fig. 2; Fig. 4 is a partial horizontal section through another form of my invention; Figs. 5 and 6 are detail vertical sections taken on the lines 5—5 and 6—6 respectively of Fig. 4; Fig. 7 is a cross section on line 7—7 of Fig. 8, the latter being a horizontal section partly (at the left) on line 8—8 of Fig. 7, and partly (at the right) on line 8ª—8ª of Fig. 7, showing another form of my invention; and Fig. 9 is a view similar to Fig. 8 showing still another form of construction.

In the construction illustrated by Figs. 1, 2, and 3, the kiln comprises an outer wall A of circular cross section, a floor B, and a roof C. At suitable points, say 90° apart, a number of lower furnaces D are arranged in or adjacent to the said wall A, the said furnaces having their discharge openings below the level of the floor B, as shown at the right-hand portion of Fig. 2. With these discharge ends of the furnaces are in communication the outer ends of channels or heat leaders E, extending under the floor B toward the center of the kiln; in the example shown, there are four such heat leaders. Immediately above them, the floor B is imperforate (see Fig. 3), but the other portions of the bottom are provided with apertures F through which the hot gases from the furnaces D may pass up into the kiln. The furnaces D may be of any approved construction. Below the bottom or floor B is arranged a horizontal wall G, the floor B and wall G together forming a double bottom. I prefer however, to extend the heat leaders E below the wall G, so that the height of said leaders will be greater than the distance between the floor B and wall G, the bottom of the heat leader being indicated at *e* in Figs. 2 and 3. At points of the kiln which are intermediate between the furnaces D, (that is to say, in positions at 45° from said furnaces, in the example shown,) I arrange another set of furnaces H (of any suitable construction) preferably above the level of the floor, and the hot gases from these upper furnaces are adapted to enter the low ends of the bag-flues J disposed within the kiln adjacent to the wall A and opening at their upper ends into the interior of the kiln. In order that the hot gases from the lower furnaces D may be thoroughly distributed within the kiln, the space between the floor B and wall G is subdivided into (four) sections by radial vertical partitions K disposed at the same points as the furnaces H, that is to say, intermediate between the heat leaders E, so that each heat leader communicates with only one of the compartments or sections formed by the partitions K. Parallel transverse partitions L, preferably at uniform distances from each other, extend in the space between the floor B and the bottom wall G, said partitions being vertical and arc-shaped, starting at a distance from the partitions K and terminating at the edge of the heat leader E. The hot gases from the heat leader may thus pass through the transverse channels M situated between the partitions L and also through the radial channels N extending along the radial partitions K. The hot gases then enter the kiln through the floor openings F which are immediately above the said channels M, N. For structural reasons (on account of the extremely high temperatures prevailing in the heat leaders), it is impracticable to construct the arch at the top of the heat leaders E of any great width. On the other hand, since the heat leaders supply several channels M, it follows that the capacity (or cross section) of a heat leader must be considerably greater than that of a channel M, and since the width of the heat leader is limited in view of the structural feature above referred to, I have gained the required capacity of cross section of the heat leaders by increasing their height, which I accomplish by extending them below the level of the horizontal wall G.

For carrying away the hot gases from the interior of the kiln, the following arrangement is provided: Stacks O are provided in the wall A, preferably directly above the lower furnaces D. Each of these stacks is connected with the interior of the kiln at two different levels, the upper connection P extending through the roof C, or at least to a point near the roof, and being controllable by a damper or valve Q, while the lower connection R extends to a point about midway between the floor B and the lower edge of the roof C, at a level below the upper ends of the bag-flues J. The lower end of each stack has a channel S leading to the adjacent furnace D, which channel is controlled by a valve T. A pivoted or other valve U is located in the lower portion of the stack O between the connections to the channels S and P; in one position, this valve closes the channel R, in the other (Fig. 2) it enables the hot gases from said channel to reach the stack. If it is desired to operate with updraft only, the furnaces D are operated alone, the doors of the upper furnaces H being generally closed during such operation; fire is made in the furnaces D, the valve Q is opened, T closed, and U placed vertical. The hot gases will then pass through the heat leaders E, channels M and N, and apertures F in the floor B, into the interior of the kiln, heating the ware therein. If the connections P are open and the connections R closed, the hot gases will travel in a substantially vertical direction through the entire mass of goods contained in the kiln; if it is desired at any time to heat the lower portion of the stacked goods more strongly, this can be effected by a proper manipulation of the valves Q and U, even to the extent of closing the valves Q entirely and opening the valves U fully. When it is desired to operate with a downdraft only, the valves Q are closed, the valves U are brought to the position in which they cut off the connection between the channels R and the stacks O, and fire is made in the upper furnaces H, while the lower furnaces D are inactive, but connected with the stacks O by opening the respective valves T. The hot gases from the furnaces H will pass up through the bag-flues J and then down through the ware, the floor apertures F, into the channels M, N, the furnaces D, to the channels S and out through the stacks O. In this case also, a moderation and regulation of the heating effect within the kiln may be obtained by a proper manipulation of the valves U (and, if desired, of the valves T also), so as to cause a portion of the hot gases to pass through the channels R. If both sets of furnaces are operated simultaneously, a combined updraft and downdraft may be obtained within the kiln, the valves in this case being in the position shown in Fig. 2 (Q and T closed, and U swung to connect R with O). The gases from the lower furnaces will pass through the kiln floor and up to the channels R, while the gases from the upper furnaces H will in this case pass up the bag-flues J and then down to the same outlet channels R. It will be obvious that the heating effect may be altered in various manners according as one set of furnaces or both are operated, and according to the adjustment of the valves Q, T, and U. It will be understood that all these valves have actuating members projecting to the outside of the kiln, or at least accessible from the outside of the kiln.

In the construction illustrated by Figs. 4, 5, and 6, there are upper furnaces H' and lower furnaces D' set 60° apart instead of 90° apart, that is to say, each set would contain six furnaces instead of four. The radial partitions K' are 60° apart, and the transverse partitions L' are straight instead of arc-shaped. Their relation to the heat leaders E is substantially the same as in Figs. 1, 2, and 3, that is to say, the transverse partitions start from the edges of the heat leaders; but in this form of my invention, the transverse partitions L' have been shown as brought into actual contact with the radial partitions K', so that this embodiment of my invention contains no radial channels corresponding to the radial channels N of the construction first described. The arrangement of the upper furnaces relatively to their bag-flues J is the same as described above. The lower furnaces D' have been shown as located above the level of the floor B, with a duct V leading downwardly from each furnace D' to the heat leader E, the floor construction being the same as described above, that is to say, there are apertures F over the transverse channels M', but none above the heat leaders E. Of course, the preferred arrangement of the upper furnaces H' is again half-way between the lower furnaces D', that is to say, 30° from them, as shown in Fig. 4. The lower furnaces D' have lateral connections S', controlled by valves T', leading to the stacks O', the other channels P, R, and valves Q, U being the same as in Figs. 1, 2, and 3. The stacks O' are not in the same vertical planes with the lower furnaces D', but slightly to one side, about half-way between the upper and lower furnaces, as shown in Fig. 4. The downtake flues or ducts V enable the gases from the lower furnaces to reach the heat leaders and the space below the perforated floor. The operation and adjustments are the same as in the construction described above.

As shown in Figs. 7 and 8, I have illustrated the application of my invention to a rectangular kiln. The wall A″ has on one side three evenly spaced upper furnaces H″ connected with the interior of the kiln by means of bag-flues J″ similar to those previously described. On the same side, and preferably midway between the upper furnaces, I arrange lower furnaces D″ communicating with heat leaders E″ extending to the opposite side of the kiln, below the perforated floor B″. The perforations F″ are directly above, and in communication with, transverse channels M″ which at one end communicate with the respective heat leader E″, and at the other end are closed by walls or partitions K″ arranged at right angles to the transverse partitions L″ which separate adjacent channels M″ from each other. At the opposite (long) side of the rectangular kiln, stacks O″ are arranged, either directly opposite the lower furnaces, as shown, or in any other convenient manner. These stacks communicate with the interior of the kiln, above the perforated floor, by means of upper and lower connections P″ and R″ respectively, controlled by valves Q″ and U″ of the same character as described above, and I also provide a connection S″, controlled by a valve T″, for connecting the stack O″ with the space below the perforated floor B″. The operation of this form of my invention will be substantially the same as in the case described with reference to Figs. 1 to 6.

While the arrangement of the channels M″ in Fig. 8 is similar to that of the channels M′ of Fig. 4 (that is to say, these transverse channels are closed at one end by a longitudinal wall, and there are no longitudinal channels along said wall), the arrangement shown in Fig. 9 corresponds to that of Fig. 1, that is, the transverse walls or partitions L* extend from the heat leaders E* to points at a distance from the partition K* which divide the space under the floor B* into a series of separate compartments; thus additional channels N* are formed along the partitions K*, and the apertures F* are located above the channels M*, N*. I have not deemed it necessary to show this construction in cross section, since such a view would be practically identical with Fig. 2.

The two sets of furnaces have been referred to as "upper" and "lower" furnaces respectively; these terms refer to the function of these furnaces in supplying hot gases to the kiln above and below the perforated floor respectively, rather than to the relative levels at which such furnaces are arranged.

Various modifications may be made without departing from the nature of my invention as set forth in the appended claims.

I claim as my invention:

1. A kiln comprising a surrounding wall, a roof, a floor, a horizontal wall below said floor, heat leaders located immediately beneath the floor and extending below the level of said horizontal wall, partitions extending from said horizontal wall upwardly to the floor and dividing the space under the floor into separate compartments, lower furnaces communicating with said heat leaders, upper furnaces communicating with the interior of the kiln above the floor, the latter being apertured, and a stack communicating with the interior of the kiln.

2. A kiln comprising a surrounding wall, a roof, a floor provided with apertures, a horizontal wall below said floor, heat leaders located immediately beneath the floor and extending to a level below that of said horizontal wall, partitions extending from said horizontal wall upwardly to the floor between the heat leaders and dividing the space under the floor into separate compartments, and means for conveying the hot gases away from the interior of the kiln.

3. A kiln comprising an outer wall, a roof, a floor, a wall below said floor, heat leaders located beneath said floor, partitions extending from the last-named wall upwardly to the floor between the heat leaders, the latter being extended downwardly below the level of said wall, and other partitions extending transversely from the first-named partitions to the heat leaders between said floor and wall and forming transverse channels, the floor being perforated above said channels but imperforate above the heat leaders.

4. A kiln comprising an outer wall, a roof, a floor, a lower wall beneath said floor, heat leaders located beneath said floor, partitions extending from the said lower wall upwardly to the floor between the heat leaders, and other partitions extending transversely from contact with the first-named partitions to the heat leaders between said floor and lower wall and forming transverse channels, the floor being perforated above said channels.

5. A kiln comprising an outer wall, a roof, a perforated floor, two sets of furnaces, both located above the level of the floor, heat leaders under the floor, downtake flues connecting the furnaces of one set with said heat leaders, and upward bag-flues connecting the furnaces of the other set with the interior of the kiln above the floor.

6. A kiln comprising an outer wall, a roof, a perforated floor, means for supplying a heating medium to the space beneath the floor, a stack having separate connections with the interior of the kiln at different levels above the floor, and means for controlling said connections independently.

7. A kiln comprising an outer wall, a roof, a perforated floor, means for supplying a heating medium to the space beneath said floor, a stack having a connection leading to the interior of the kiln adjacent to the roof, and another connection leading to the interior of the kiln at a lower level yet above the floor, and means for controlling said connections independently.

8. A kiln comprising an outer wall, a roof, a perforated floor, a stack having a connection with the interior of the kiln adjacent to the roof and another connection with said interior at a lower level, means for controlling said connections, a furnace communicating with the space beneath the floor and located beneath the stack, and adapted to communicate therewith, and means for controlling the direct connection of said furnace with the stack.

9. A kiln comprising an outer wall, a roof, a perforated floor, a stack having upper and lower connection with the interior of the kiln and independent means for controlling said connections, a furnace communicating with the space beneath the floor and located at the base of the said stack, and adapted to communicate with said stack, and means for controlling the connection leading from the stack directly to said furnace.

10. A kiln comprising a surrounding wall, a roof, an apertured floor, a horizontal wall beneath said floor, heat leaders located beneath the floor, and transverse partitions extending between the said floor and wall adjacent to the heat leaders on each side thereof but terminating at the heat leaders, and means for heating the kiln and for carrying away the hot gases.

11. A kiln comprising a surrounding wall, a roof, a floor, a horizontal wall below said floor, heat leaders located beneath the floor and extending below the level of said horizontal wall, the space under the floor being divided into separate compartments, lower furnaces communicating with said heat leaders, upper furnaces communicating with the interior of the kiln above the floor, the latter being apertured, and a stack communicating with the interior of the kiln.

12. A kiln comprising a surrounding wall, a roof, an apertured floor, a horizontal wall below said floor, heat leaders located beneath the floor and extending below the level of said horizontal wall, means for supplying a heating medium to the heat leaders, and means for carrying the hot gases away from the kiln.

13. A kiln comprising a surrounding wall, a roof, an apertured floor, a horizontal wall below said floor, heat leaders located beneath the floor and extending below the level of said horizontal wall, lower furnaces communicating with said heat leaders, upper furnaces communicating with the interior of the kiln above the floor, and a stack communicating with the interior of the kiln.

14. A kiln comprising an outer wall, a roof, a perforated floor, a stack having an opening connecting it with the interior of the kiln above said floor, means to close said opening, a furnace, a horizontal wall beneath said floor, the space between said floor and said horizontal wall communicating with said furnace, and also with said stack, the connections from the stack to the furnace and to the space beneath the floor being both extraneous to the interior of the kiln, and means to interrupt the communication between said space and said stack.

15. A kiln comprising an outer wall, a roof, a perforated floor, a stack having an opening connecting it with the interior of the kiln above said floor, means to close said opening, a furnace, a horizontal wall beneath said floor, the space between said floor and said horizontal wall communicating with said furnace, and the latter communicating with the said stack, and means to control the communication between said furnace and said stack.

16. A kiln comprising an outer wall, a roof, a perforated floor, a stack having an opening connecting it with the interior of the kiln above said floor, means to close said opening, a furnace arranged beneath said stack, an opening connecting said furnace with said stack, means to control said last-named opening, and a horizontal wall arranged beneath said floor, the space between said floor and horizontal wall communicating directly with said furnace.

17. A kiln comprising an outer wall, a roof, a perforated floor, a stack having an opening connecting it with the interior of the kiln above said floor, means to close said opening, a furnace arranged laterally of said floor, a horizontal wall arranged beneath said floor, the space between said floor and horizontal wall having a connection with said furnace, and another connection with the stack, the connections from the stack to the furnace and to the space beneath the floor being both extraneous to the interior of the kiln, and means to control the last-named connection.

18. A kiln comprising an outer wall, a roof, an apertured floor, a chamber or space beneath said floor, a stack for carrying away hot gases from the kiln, and a furnace for supplying a heating medium, said furnace having one connection leading to said space below the floor, and another connection leading to said stack.

19. A kiln comprising an outer wall, a roof, a perforated floor, a furnace for supplying a heating medium, a stack for carrying away hot gases from the kiln, and a chamber or space beneath said perforated floor, said chamber being connected both with said stack and with said furnace, the connections from the stack to the furnace and to said chamber being both extraneous to the interior kiln chamber.

20. A kiln comprising an outer wall, a roof, a perforated floor, a furnace for supplying a heating medium, a stack having a connection with the interior of the kiln near the top thereof and another connection about half-way between the top and said floor, and a space or chamber beneath said floor, communicating with said furnace.

21. A kiln comprising an outer wall, a roof, a perforated floor, a space or chamber beneath said floor, a furnace for supplying a heating medium, a stack having a controllable connection with the interior of the kiln above the said floor, and another controllable connection with said chamber, and a third connection, extraneous to the interior of the kiln leading from the furnace direct to said chamber.

In testimony whereof, I have signed this specification in the presence of two subscribing witnesses.

HARFORD P. JENKS.

Witnesses:
VESTA E. YAPLE,
WALTER BOULGER.

Copies of this patent may be obtained for five cents each, by addressing the "Commissioner of Patents, Washington, D. C."